US008677453B2

(12) United States Patent
Chang et al.

(10) Patent No.: US 8,677,453 B2
(45) Date of Patent: Mar. 18, 2014

(54) HIGHLY PARALLEL EVALUATION OF XACML POLICIES

(75) Inventors: David Chang, Milpitas, CA (US); Nagaraj Bagepalli, San Jose, CA (US); Harsha Narayan, San Jose, CA (US); Abhijit Patra, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1443 days.

(21) Appl. No.: 12/123,227

(22) Filed: May 19, 2008

(65) Prior Publication Data
US 2009/0288136 A1 Nov. 19, 2009

(51) Int. Cl.
H04L 29/06 (2006.01)

(52) U.S. Cl.
USPC .................. 726/3; 726/1; 726/2; 707/764

(58) Field of Classification Search
USPC .............................................. 726/1; 707/764
See application file for complete search history.

(56) References Cited

U.S. PATENT DOCUMENTS

| | | | |
|---|---|---|---|
| 5,706,429 A | 1/1998 | Lai et al. | |
| 6,131,120 A | 10/2000 | Reid | |
| 6,205,480 B1 | 3/2001 | Broadhurst et al. | |
| 6,223,217 B1 | 4/2001 | Pettus | |
| 6,460,141 B1 | 10/2002 | Olden | |
| 6,594,712 B1 | 7/2003 | Pettey et al. | |
| 6,640,238 B1 | 10/2003 | Bowman-Amuah | |
| 6,658,469 B1 | 12/2003 | Massa et al. | |
| 6,675,200 B1 | 1/2004 | Cheriton et al. | |
| 6,728,884 B1 | 4/2004 | Lim | |
| 6,754,829 B1 | 6/2004 | Butt et al. | |
| 6,804,720 B1 | 10/2004 | Vilander et al. | |
| 6,889,294 B1 | 5/2005 | Nichols et al. | |
| 6,901,491 B2 | 5/2005 | Kohn et al. | |
| 6,912,604 B1 | 6/2005 | Tzeng et al. | |

(Continued)

FOREIGN PATENT DOCUMENTS

| | | |
|---|---|---|
| WO | 03104943 A2 | 12/2003 |
| WO | 2005081855 A2 | 9/2005 |

(Continued)

OTHER PUBLICATIONS

Yuan et al., "Attribute Based Access Control (ABAC) for Web Services", Proceedings of the IEEE International Conference on Web Services, 2005.*

(Continued)

*Primary Examiner* — Taghi Arani
*Assistant Examiner* — Thaddeus Plecha (57) ABSTRACT

Techniques for highly parallel evaluation of XACML policies are described herein. In one embodiment, attributes are extracted from a request for accessing a resource including at least one of a user attribute and an environment attribute. Multiple individual searches are concurrently performed, one for each of the extracted attributes, in a policy store having stored therein rules and policies written in XACML, where the rules and policies are optimally stored using a bit vector algorithm. The individual search results associated with the attributes are then combined to generate a single final result using a predetermined policy combination algorithm. It is then determined whether the client is eligible to access the requested resource of the datacenter based on the single final result, including performing a layer-7 access control process, where the network element operates as an application service gateway to the datacenter. Other methods and apparatuses are also described.

22 Claims, 7 Drawing Sheets

(56) References Cited

U.S. PATENT DOCUMENTS

| | | | |
|---|---|---|---|
| 6,922,724 B1 | 7/2005 | Freeman et al. |
| 6,947,984 B2 | 9/2005 | Schweitzer et al. |
| 6,985,955 B2 | 1/2006 | Gullotta et al. |
| 6,985,956 B2 | 1/2006 | Luke et al. |
| 6,986,040 B1 | 1/2006 | Kramer et al. |
| 6,999,462 B1 | 2/2006 | Acharya |
| 7,010,807 B1 | 3/2006 | Yanovsky |
| 7,051,114 B1 | 5/2006 | Ravishankar et al. |
| 7,051,126 B1 | 5/2006 | Franklin |
| 7,088,727 B1 | 8/2006 | Short et al. |
| 7,100,200 B2 | 8/2006 | Pope et al. |
| 7,114,096 B2 | 9/2006 | Freimuth et al. |
| 7,114,180 B1 | 9/2006 | DeCaprio |
| 7,117,526 B1 | 10/2006 | Short |
| 7,120,792 B1 | 10/2006 | Jacobson et al. |
| 7,146,635 B2 | 12/2006 | Eggebraaten et al. |
| 7,149,808 B2 | 12/2006 | Lu |
| 7,149,817 B2 | 12/2006 | Pettey |
| 7,149,819 B2 | 12/2006 | Pettey |
| 7,149,892 B2 | 12/2006 | Freed et al. |
| 7,171,681 B1 | 1/2007 | Duncan et al. |
| 7,177,277 B2 | 2/2007 | Koponen et al. |
| 7,178,163 B2 | 2/2007 | Reeves, Jr. |
| 7,184,445 B2 | 2/2007 | Gupta et al. |
| 7,185,192 B1 | 2/2007 | Kahn |
| 7,185,361 B1 | 2/2007 | Ashoff et al. |
| 7,185,364 B2 | 2/2007 | Knouse et al. |
| 7,194,554 B1 | 3/2007 | Short et al. |
| 7,197,556 B1 | 3/2007 | Short et al. |
| 7,209,478 B2 | 4/2007 | Rojas et al. |
| 7,209,970 B1 | 4/2007 | Everson et al. |
| 7,209,977 B2 | 4/2007 | Acharya et al. |
| 7,216,152 B2 | 5/2007 | Short et al. |
| 7,216,225 B2 | 5/2007 | Haviv et al. |
| 7,225,364 B2 | 5/2007 | Carnevale et al. |
| 7,228,412 B2 | 6/2007 | Freed et al. |
| 7,308,101 B2 | 12/2007 | Wing |
| 7,334,013 B1 | 2/2008 | Calinov et al. |
| 7,350,229 B1 | 3/2008 | Lander |
| 7,584,301 B1 | 9/2009 | Joshi |
| 7,592,906 B1 * | 9/2009 | Hanna et al. ................. 340/506 |
| 7,630,877 B2 | 12/2009 | Brown et al. |
| 7,633,955 B1 | 12/2009 | Saraiya et al. |
| 7,664,110 B1 | 2/2010 | Lovett et al. |
| 7,693,991 B2 | 4/2010 | Greenlee et al. |
| 7,764,678 B2 | 7/2010 | Johnson et al. |
| 7,774,455 B1 | 8/2010 | Tock et al. |
| 2002/0107971 A1 | 8/2002 | Bailey et al. |
| 2002/0129271 A1 | 9/2002 | Stanaway, Jr. et al. |
| 2002/0178119 A1 | 11/2002 | Griffin et al. |
| 2002/0199006 A1 | 12/2002 | Magnussen et al. |
| 2003/0005073 A1 | 1/2003 | Yoshizawa et al. |
| 2003/0014544 A1 | 1/2003 | Pettey |
| 2003/0043794 A1 | 3/2003 | Cayton et al. |
| 2003/0061507 A1 * | 3/2003 | Xiong et al. ................. 713/201 |
| 2003/0076577 A1 | 4/2003 | Dominic et al. |
| 2003/0097454 A1 | 5/2003 | Yamakawa et al. |
| 2003/0097518 A1 | 5/2003 | Kohn et al. |
| 2004/0010545 A1 | 1/2004 | Pandya |
| 2004/0010612 A1 | 1/2004 | Pandya |
| 2004/0030757 A1 | 2/2004 | Pandya |
| 2004/0030770 A1 | 2/2004 | Pandya |
| 2004/0030806 A1 | 2/2004 | Pandya |
| 2004/0037299 A1 | 2/2004 | Pandya |
| 2004/0037319 A1 | 2/2004 | Pandya |
| 2004/0111640 A1 | 6/2004 | Baum |
| 2004/0128538 A1 | 7/2004 | Gmuender et al. |
| 2004/0139319 A1 | 7/2004 | Favazza et al. |
| 2004/0165588 A1 | 8/2004 | Pandya |
| 2004/0193695 A1 | 9/2004 | Salo et al. |
| 2004/0210320 A1 | 10/2004 | Pandya |
| 2004/0213284 A1 | 10/2004 | Clarke et al. |
| 2005/0076166 A1 | 4/2005 | Shearer |
| 2005/0108518 A1 | 5/2005 | Pandya |
| 2005/0147039 A1 | 7/2005 | Biran et al. |
| 2005/0188212 A1 | 8/2005 | Laferriere et al. |
| 2005/0238035 A1 | 10/2005 | Riley |
| 2005/0274797 A1 | 12/2005 | Mollett et al. |
| 2005/0278384 A1 | 12/2005 | Lin et al. |
| 2005/0283615 A1 | 12/2005 | Chakravarthi et al. |
| 2005/0286513 A1 | 12/2005 | King |
| 2006/0031506 A1 | 2/2006 | Redgate |
| 2006/0045099 A1 | 3/2006 | Chang et al. |
| 2006/0047771 A1 | 3/2006 | Blackmore et al. |
| 2006/0067346 A1 | 3/2006 | Tucker et al. |
| 2006/0069668 A1 | 3/2006 | Braddy et al. |
| 2006/0070131 A1 | 3/2006 | Braddy et al. |
| 2006/0074837 A1 | 4/2006 | Braddy et al. |
| 2006/0075057 A1 | 4/2006 | Gildea et al. |
| 2006/0075114 A1 | 4/2006 | Panasyuk et al. |
| 2006/0075132 A1 | 4/2006 | Liu |
| 2006/0075463 A1 | 4/2006 | Braddy et al. |
| 2006/0077989 A1 | 4/2006 | Lu et al. |
| 2006/0087989 A1 | 4/2006 | Gai et al. |
| 2006/0095334 A1 | 5/2006 | Simmons |
| 2006/0101225 A1 | 5/2006 | Aloni et al. |
| 2006/0123481 A1 | 6/2006 | Bhatnagar et al. |
| 2006/0136570 A1 | 6/2006 | Pandya |
| 2006/0143206 A1 * | 6/2006 | Lock et al. ................. 707/101 |
| 2006/0168274 A1 | 7/2006 | Aloni et al. |
| 2006/0174104 A1 | 8/2006 | Crichton et al. |
| 2006/0200477 A1 | 9/2006 | Barrenechea |
| 2006/0221967 A1 * | 10/2006 | Narayan et al. ............... 370/392 |
| 2006/0230119 A1 | 10/2006 | Hausauer et al. |
| 2006/0233101 A1 | 10/2006 | Luft et al. |
| 2006/0236063 A1 | 10/2006 | Hausauer et al. |
| 2006/0236385 A1 | 10/2006 | Innes et al. |
| 2006/0259498 A1 * | 11/2006 | Ellison et al. ................. 707/100 |
| 2006/0259661 A1 | 11/2006 | Feng et al. |
| 2006/0262782 A1 | 11/2006 | Biran et al. |
| 2006/0262796 A1 | 11/2006 | Biran et al. |
| 2006/0262797 A1 | 11/2006 | Biran et al. |
| 2006/0262799 A1 | 11/2006 | Biran et al. |
| 2006/0268866 A1 | 11/2006 | Lok |
| 2006/0291803 A1 | 12/2006 | Watson et al. |
| 2007/0002769 A1 | 1/2007 | Matityahu et al. |
| 2007/0005801 A1 | 1/2007 | Kumar et al. |
| 2007/0056019 A1 * | 3/2007 | Allen et al. ................. 726/1 |
| 2007/0067638 A1 | 3/2007 | Haibl et al. |
| 2007/0073966 A1 | 3/2007 | Corbin |
| 2007/0121615 A1 | 5/2007 | Weill et al. |
| 2007/0130167 A1 | 6/2007 | Day et al. |
| 2007/0150614 A1 * | 6/2007 | Ramachandran et al. .... 709/238 |
| 2007/0153798 A1 | 7/2007 | Krstulich |
| 2007/0160072 A1 | 7/2007 | Thalanany et al. |
| 2007/0160073 A1 | 7/2007 | Toumura et al. |
| 2007/0165672 A1 | 7/2007 | Keels et al. |
| 2007/0171921 A1 | 7/2007 | Wookey et al. |
| 2007/0174429 A1 | 7/2007 | Mazzaferri et al. |
| 2007/0179955 A1 | 8/2007 | Croft et al. |
| 2007/0180088 A1 | 8/2007 | Zhao |
| 2007/0180447 A1 | 8/2007 | Mazzaferri et al. |
| 2007/0180493 A1 | 8/2007 | Croft et al. |
| 2007/0226750 A1 | 9/2007 | Sharp et al. |
| 2008/0120302 A1 | 5/2008 | Thompson et al. |
| 2009/0037379 A1 * | 2/2009 | Bou-Diab et al. ................. 707/3 |

FOREIGN PATENT DOCUMENTS

| | | |
|---|---|---|
| WO | 2005104443 A2 | 11/2005 |
| WO | 2006031496 A2 | 3/2006 |
| WO | 2006113722 A2 | 10/2006 |

OTHER PUBLICATIONS

Rao et al., "An Algebra for Fine-Grained Integration of XACML Policies", Jun. 2009, pp. 63-72.*
Srinivasan, T. et al., "Scalable and Parallel Aggregated Bit Vector Packet Classification using Prefix Computation Model," IEEE, Proceedings of the International Symposium on Parallel Computing in Electrical Engineering (PARELEC'06), 2006, 6 pages.
Lakshman, T.V. et al., "High-Speed Policy-based Packet Forwarding Using Efficient Multi-dimensional Range Matching," ACM (56) References Cited

OTHER PUBLICATIONS

SIGCOMM Computer Communication Review, 28(4), Oct. 1998, pp. 203-214.
Baboescu, Florin et al., "Scalable Packet Classification," IEEE/ACM Transactions on Networking, 13(1), Feb. 2005, pp. 2-14.
Li, Ji et al., "Scalable Packet Classification Using Bit Vector Aggregating and Folding," MIT LCS Technical Memo: MIT-LCS-TM-637, Apr. 13, 2007, 9 pages.
Office Action dated Aug. 12, 2011 for U.S. Appl. No. 12/101,857, 27 pages.

* cited by examiner

HIGHLY PARALLEL EVALUATION OF XACML POLICIES

FIELD OF THE INVENTION

The present invention relates generally to access control processing within a network element. More particularly, this invention relates to highly parallel evaluation of XACML policies of an access control.

BACKGROUND

Every enterprise has a need to secure resources accessed by employees, partners, and customers. For example, browser based access to portals which aggregate resources (web pages, applications, services, etc.) are typical in today's enterprises. Clients send requests to servers for resources, but before a server can return that resource it must determine if the requester is authorized to use the resource. This is also referred to as access control, which is typically performed based on a set of policies to determine whether a client is eligible to access the requested resource.

Policies and/or rules commonly used in a firewall are based on five fields: source and destination IP prefix, source and destination port, and protocol. However, such rules are typically based on IP addresses and ports (e.g., layer-4 information) that in some cases may not sufficiently identify a user (e.g., layer-7 information). Such an implementation tends to be fast but lacks functionality and flexibility.

In other areas, rules are used in products that do similar things existed as server applications such as Siteminder from Computer Associates or Aqualogix from BEA Systems. In these situations, applications can outsource access control decisions to Siteminder or Aqualogix. It is easier for auditing for regulatory compliance and can be used by multiple applications. However, such an access control tends to be slow and proprietary.

XACML (extensible access control markup language) has been defined and now being used to provide a standards-based policy language which allows administrators to define the access control requirements for their application resources. The language and schema support include data types, functions, and combining logic which allow complex (or simple) rules to be defined. XACML also includes an access decision language used to represent the runtime request for a resource. When a policy is located which protects a resource, functions compare attributes in the request against attributes contained in the policy rules ultimately yielding a permit or deny decision.

However, there has been a lack of efficient ways to manage XACML based rules and policies such that accesses to the rules and policies can be improved significantly.

SUMMARY OF THE DESCRIPTION

Techniques for highly parallel evaluation of XACML policies are described herein. In one embodiment, in response to a request received from a client for accessing a resource of an application server of a datacenter having a plurality of servers, attributes are extracted from the request. The extracted attributes include at least one of a user attribute identifying a user of the client and an environment attribute identifying an environment associated with the user. Multiple individual searches are concurrently performed, one for each of the extracted attributes, in a policy store having stored therein rules and policies written in XACML (extensible access control markup language), where the rules and policies are optimally stored including being indexed using a bit vector algorithm. The individual search results associated with the attributes are then combined to generate a single final result using a predetermined policy combination algorithm. It is then determined whether the client is eligible to access the requested resource of the datacenter based on the single final result, including performing a layer-7 access control process, where the network element operates as an application service gateway to the datacenter.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for highly parallel evaluation of XACML policies are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments, attribute based rules and policies are written using XACML and stored in a policy store accessible by multiple processors or core logic of a network element acting as an application service gateway to a datacenter having a variety of resources (e.g., application servers). In addition, one or more efficient indexes are built and maintained based on the attributes of the rules and policies of the policy store for improving search speeds. In addition, the indexes and/or the rules and policies are optimized using a bit vector algorithm for further enhancing search efficiency.

Further, a variety of data structures are utilized for different types of attribute searches. For example, interval tree data structures are utilized for searching based on numeric operators. Aho-Corasick DFA (deterministic finite automaton) data structures are utilized for substring searching. Patricia tree data structures are utilized for prefix searching. Some of all of the attributes can be searched substantially concurrently to obtain per-attribute search results and a final search result can be generated by combining the per-attribute search results. The per-attribute searches may be performed by multiple core logic in parallel.

Figure 1:
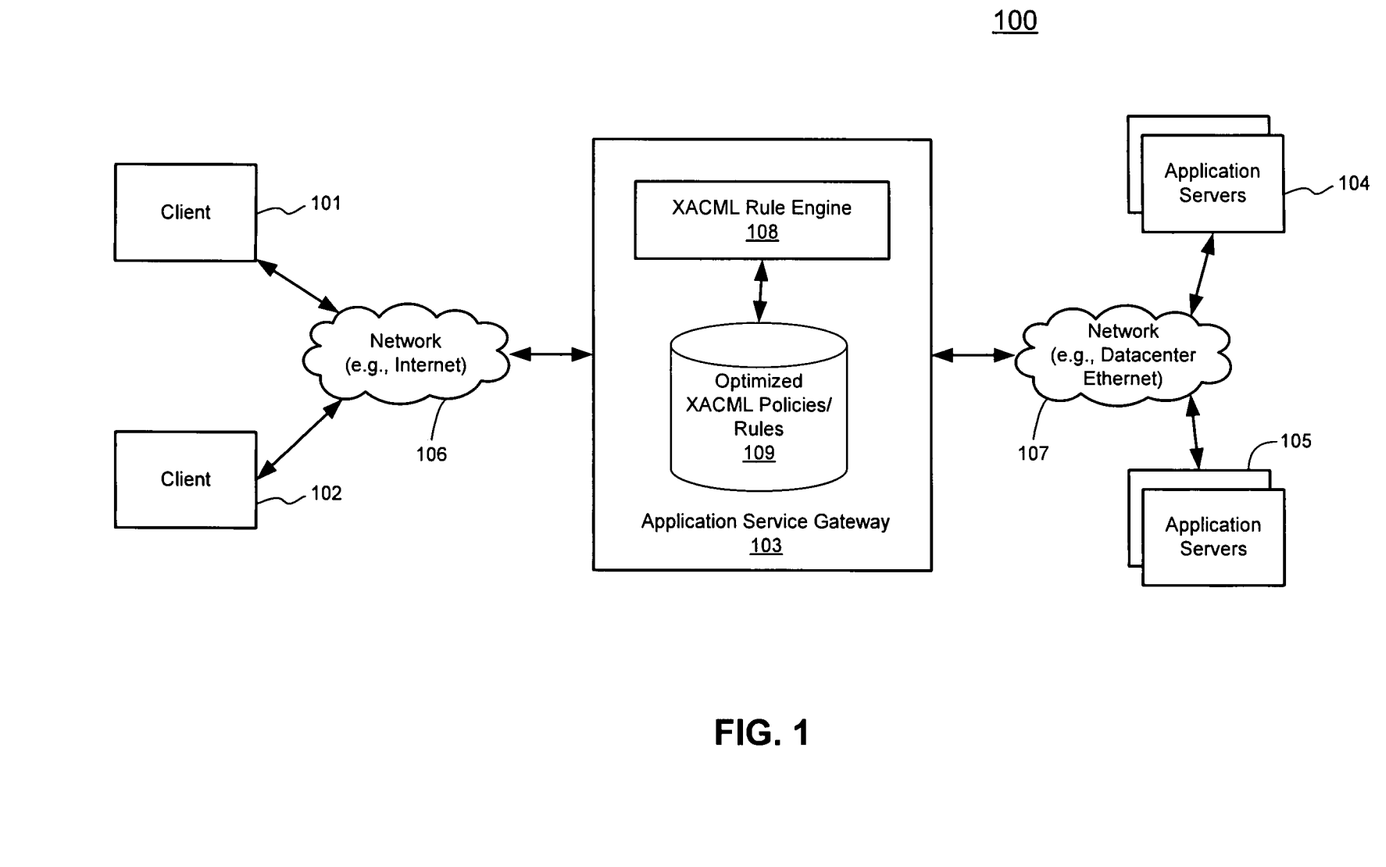
FIG. 1 is a block diagram illustrating an example of a network configuration according to one embodiment of the invention.

FIG. 1 is a block diagram illustrating an example of a network configuration according to one embodiment of the invention. Referring to FIG. 1, network configuration 100 includes one or more clients 101-102 communicatively coupled to an application service gateway or appliance device 103 in order to access one or more application servers 104-105 of a datacenter over networks 106-107. In order to access applications hosted by application servers 104-105, each of the clients 101-102 has to go through application service appliance 103 over networks 106-107. Network 106 may be a local area network (LAN) or a wide area network (WAN). Alternatively, network 106 may be an internal network of an entity such as intranet. Network 107 may be a converged fabric network such as a datacenter Ethernet (DCE) or InfiniBand™ network.

According to one embodiment, device 103 is configured to perform attribute based authentication and/or authorization of clients 101-102 to determine whether a particular client is eligible to access application servers 104-105. In one embodiment, device 103 includes multiple processors or core logic (not shown) which can be used to process network packets in various ways based on one or more policies. Processors/core logic may be configured to process any of layer 2 to layer 7 of OSI (open system interconnection) network layers of processes. For example, one processor/core may be configured to process layer 2 to layer 5 while another processor/core may be configure to process layer 5 to layer 7, etc. In one embodiment processors/core logic may be implemented using an Octeon™ compatible processor available from Cavium Networks of Mountain View, Calif.

In one embodiment, application service appliance 103 includes certain software components that are running within one or more of the multiple processors/core logic, including a rule engine 108 for determining whether a particular client is eligible to access any of the servers 104-105 based on rules and policies of the policy store 109. In one embodiment, the rules and policies are written using XACML programming language and optimized according to a variety of optimization algorithm including certain bit vector packet classification algorithms. Further, instances of rule engine 108 may be running in multiple processing core logic that can concurrently perform multiple per attribute based searches within the policy store 103. Individual search per attribute search results are then combined to generate a final single search result which is used to determine whether a particular client is eligible for accessing a particular resource of a datacenter.

Rule engine 108 is the heart of the system 100 for evaluating the policy rules configured in the system and arriving at the decisions to be performed for a given transaction. After the rules are evaluated, rule engine could come up with a set of actions to be performed in addition to permit or deny, including copying the transaction to a configured recording device; encrypting the backend session towards the server; inserting custom http headers for http transactions; and setting the marking of IP TOS field to give correct priority to the transaction, etc.

Note that network configuration 100 is shown for illustration purposes only. For example, networks 106-107 may be the same network or different networks. Other configurations may exist.

Figure 2A:
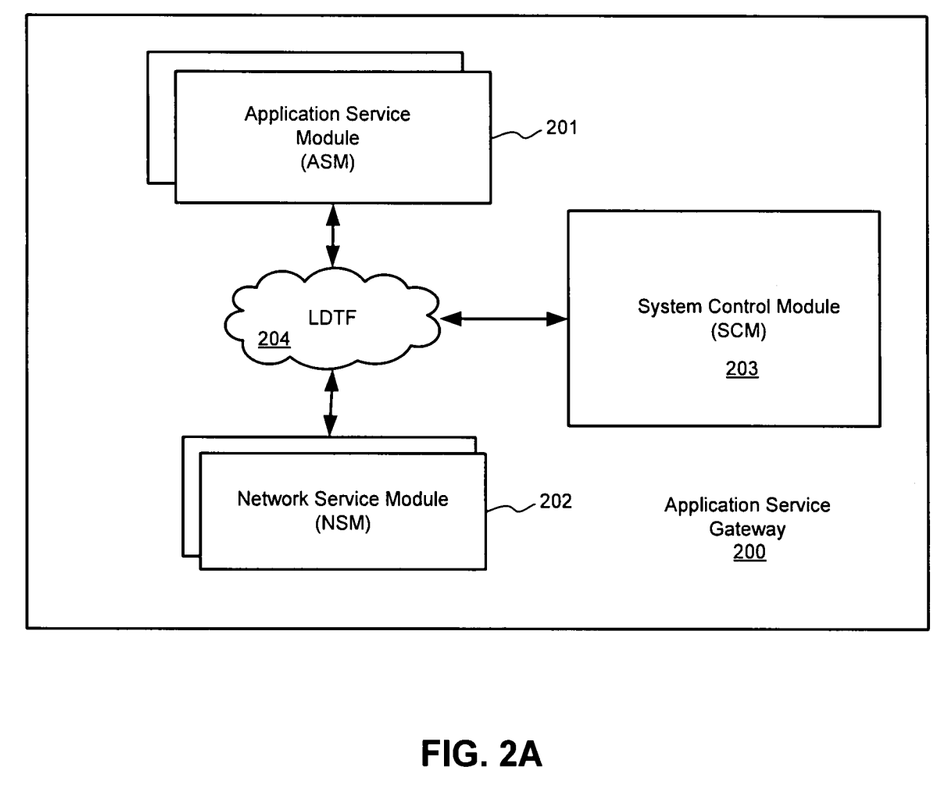
FIGS. 2A and 2B are block diagrams illustrating an example of an application service appliance or gateway according to certain embodiments.

FIG. 2A is a block diagram illustrating an example of an application service appliance or gateway according to one embodiment. For example, device 200 may be implemented as part of application service appliance 103 of FIG. 1. Referring to FIG. 2A, application service appliance 200 includes, but is not limited to, one or more application service modules (ASMs) 201 (also referred to as an application service plane) communicatively coupled to one or more network service modules (NSMs) 202 (also referred to as a network service plane) over a lossless switch fabric 204 (also referred to as a lossless data transport fabric or LDTF), which may be an InfiniBand™ compatible switch fabric. In addition, application service appliance 200 includes a system control module (SCM) 203 (also referred to as a management plane) coupled to the LDTF 204 for managing the ASMs 201 and NSMs 202.

ASMs 201 are configured to perform layer 4 to layer 7 access control based on attribute-based policies, including performing triangulated authorization based on various attributes, including user attributes, network attributes, environment attributes, and/or resource attributes, etc. An NSM includes one or more network service processor (NSP) and an ASM includes one or more application service processors (ASP).

According to one embodiment, application service appliance 200 is essentially a high-speed full-proxy device and it needs to terminate both client and server ends of a client to server connection. In effect application service appliance 200 acts as a virtual server to actual clients (e.g., clients 101-102 of FIG. 1), and a virtual client to actual servers (e.g., servers 104-105 of FIG. 1). Also, application service appliance 200 is configured to scale in order to be able to process a significant portion of the traffic passing through. This highly-scalable L7 processing bandwidth is a unique differentiator for application service appliance 200, as opposed to existing L4-L7 devices, as they expect the bulk of the traffic processing through the device to be unexamined and unchanged, hence can use a high-speed flow-switching fast path to achieve the target throughput.

According to one embodiment, SCM 203 is responsible for common system management functions as well as configuration and management of processing elements in network and application plane. The SCM 203 includes a low-end processor (also referred to as a management service processor) and has an additional out-of-band connectivity to processing elements on ASMs 201 and NSMs 202. Typically, image download, configuration information, statistic collection messages are exchanged between SCM 203 and rest of the system.

In one embodiment, NSM 202 is responsible for ingress and egress processing of external data path, IP stack for virtual interface, TCP and SSL termination, fast path flow switching, byte stream load balancing among multiple ASMs, and stream replication to a backup NSM, etc. ASM 201 is responsible for protocol proxy such as HTTP, CIFS, JDBC, etc. ASM 201 may include a protocol recognition engine, regular expression engine, rule engine, and application authorization engine, etc.

The software architecture of application service appliance 200 employs the combination of both these approaches for providing a layer 7 service. For example, TCP/SSL function is performed on one set of cores and then application processing is performed on another set of cores. Cores running application are equally capable and any available core can be used for application processing. In one embodiment, instances of a rule engine such as rule engine 108 of FIG. 1 and/or a policy store 109 of FIG. 1 are maintained by ASMs 201 and/or NSMs 202, where the rules and policies of the policy store are written in XACML and optimized according to a variety of bit vector algorithms such that multiple per attribute based searches can be concurrently performed and a final search result is generated based on the individual search result of the per attribute based searches. As a result, the access control process can be performed in a significantly higher efficiency.

When a client makes a resource request upon a server, the entity charged with access control by enforcing authorization is called the Policy Enforcement Point. In order to enforce policy, this entity will formalize attributes describing the requester at the Policy Information Point and delegate the authorization decision to the Policy Decision Point. Applicable policies are located in a policy store and evaluated at the Policy Decision Point, which then returns the authorization decision. Using this information, the Policy Enforcement Point can deliver the appropriate response to the client.

Note that ASMs 201 and NSMs 202 may be implemented as part of multiple processors, where each processor may include multiple cores or alternatively, ASMs 201 and NSMs 202 may be implemented as part of a single processor having multiple cores communicatively coupled to each other via an interconnect or bus, or a shared memory.

Figure 2B:
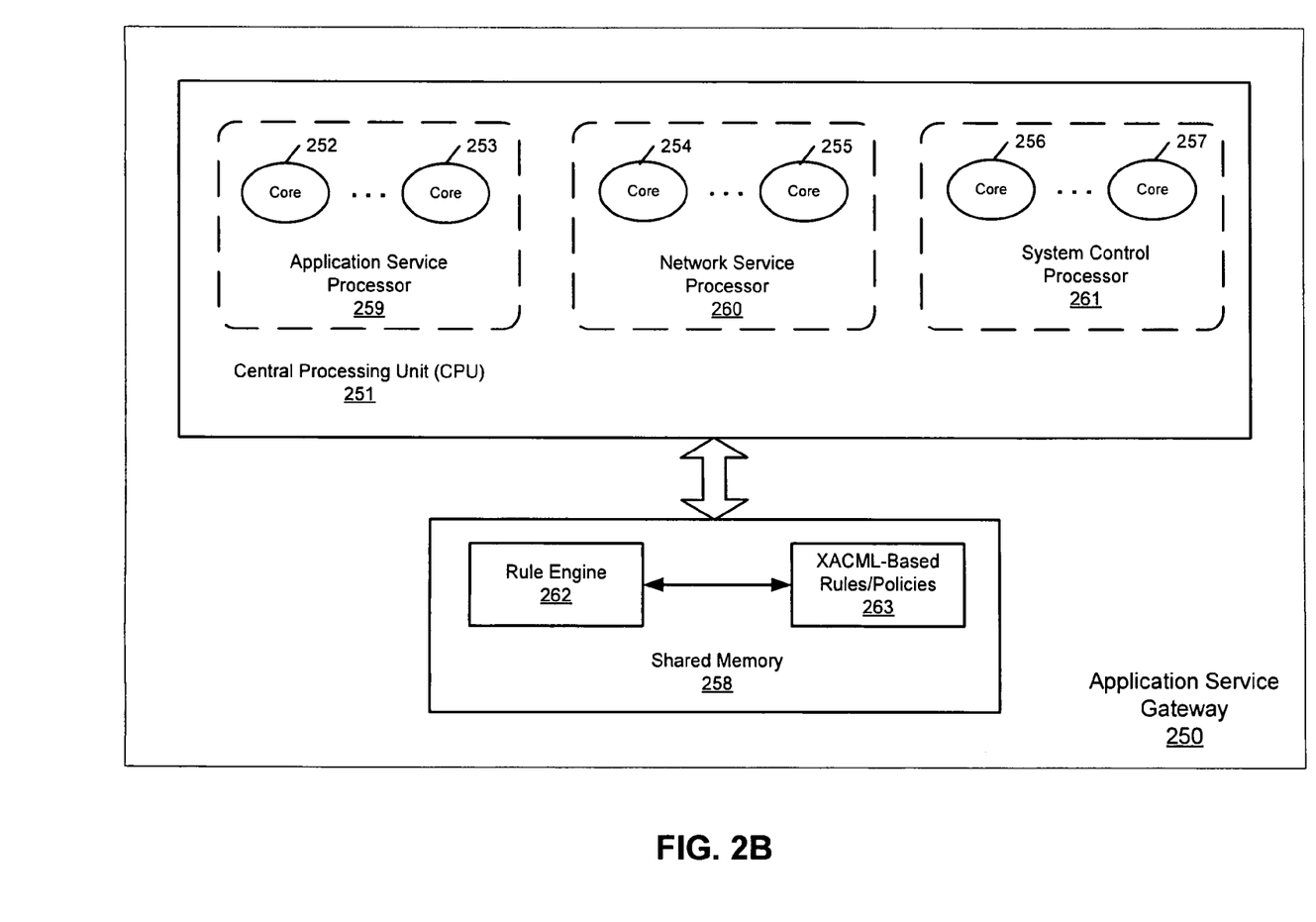

FIG. 2B is a block diagram illustrating an example of an application service appliance or gateway according to an alternative embodiment. Referring to FIG. 2B, in this example, application service gateway or appliance 250 is implemented using a single processor 251 having multiple cores 252-257 (e.g., 16 cores). Certain portions of cores 252-257 may be logically configured or partitioned to be designated as an application service processor (ASP) as part of an ASM, a network service processor (NSP) as part of an NSM, or a system control processor (SCP) as part of an SCM described above.

In this example, as shown in FIG. 2B, cores 252-253 are logically configured as an ASP 259; cores 254-255 are logically configured as an NSP 260; and cores 256-257 are logically configured as an SCP 261. The functionalities of ASP 259, NSP 260, and SCP 261 are similar to those as shown in FIG. 2A. For example, ASP 259 may be configured to handle layer 5 to layer 7 processes while NSP 260 may be configured to handle layer 2 to layer 5 processes. Note that although a single ASP, NSP and SCP are shown; multiple ASPs, NSPs, and SCPs may also be implemented, dependent upon a specification design.

In one embodiment, ASP 259, NSP 260, and SCP 261 communicate with each other via a bus or an interconnect, as well as via shared memory 258. Shared memory 258 may be implemented as an internal memory of CPU 251, an external memory, or a combination of both internal and external memories with respect to CPU 251. Further, rule engine 262 communicatively coupled to XACML-based rule/policy store 263 is loaded and running within shared memory 258 and having functionality similar to components 108-109 of FIG. 1.

Figure 3:
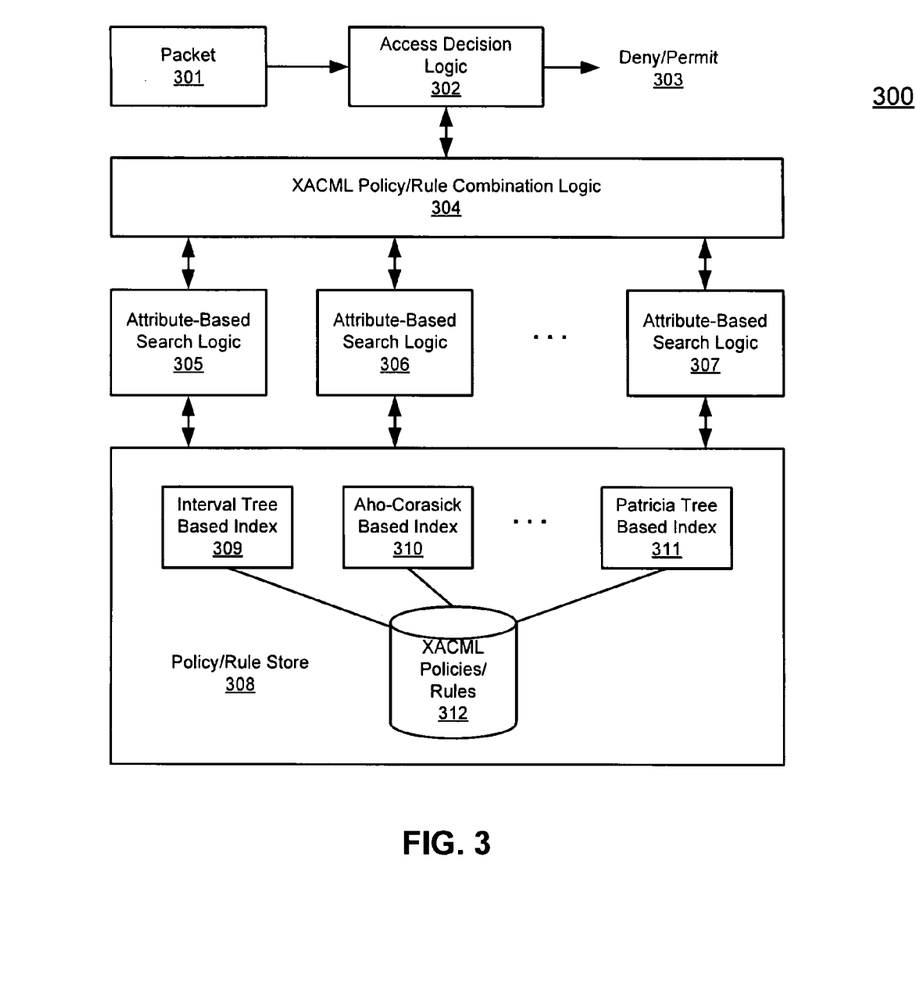
FIG. 3 is a block diagram illustrating rule engine architecture according to one embodiment of the invention.

FIG. 3 is a block diagram illustrating rule engine architecture according to one embodiment of the invention. For example, system 300 may be implemented as part of components 108-109 of FIG. 1. Referring to FIG. 3, when a packet 301 representing a client request for a resource is received by logic 302 which may be a policy enforcement point (PEP), a policy decision point (PDP), or a combination of both, certain attributes associated with the packet 301 are extracted. For each attribute, an individual search is performed via search logic 305-307 in parallel in rules and policies 312 stored in policy store 308. Individual search results are then combined by combination logic 304 which generates a final search result or final decision to be used to determine whether packet 301 is eligible to access the requested resource.

A decision for each individual search and evaluation could be one of "Permit", "Deny", "Not Applicable", or "Indeterminate". A combining algorithm may be a deny-override or a permit-override algorithm. For example, a combining algorithm can be configured as follows:

"Deny" if at least one "Deny"
"Indeterminate" if any error
"Permit" if at least one "Permit"
"Not Applicable" otherwise Rules and policies 312 are written and configured by an administrator using XACML which specifies the XML format for policies and exactly how a PDP evaluates them. XACML is an OASIS (Organization for the Advancement of Structured Information Standards) standard that describes both a policy language and an access control decision request/response language (both encoded in XML). The policy language is used to describe general access control requirements, and has standard extension points for defining new functions, data types, combining logic, etc. The request/response language allows one to form a query to ask whether or not a given action should be allowed, and interpret the result. The response includes an answer about whether the request should be allowed using one of four values: permit, deny, indeterminate (an error occurred or some required value was missing, so a decision cannot be made) or not applicable (the request cannot be answered by this service). The request/response language helps to define a standard distributed architecture where in multiple disparate external PEPs (policy enforcement points) communicate with a centralized PDP (policy decision point) for determining an access control decision.

Referring back FIG. 3, according to one embodiment, one or more indexes 309-311 are created for efficient searches. As described above, policies 312 are optimized using one or more bit vector packet classification algorithms. For example, for numeric operators (e.g., <, ( ), [ ], >, <=, >=, and =,) interval tree data structures and the corresponding index 309 are utilized. In addition, for substring searches, the Aho-corasick DFA data structures and its corresponding index 310 are utilized. Further, for prefix searches, Patricia tree data structures and its corresponding index 311 are utilized.

According to certain embodiments, the bit vector algorithms that may be used with system 300 may be implemented using one of the algorithms described in the following articles:

"High-Speed Policy-Based Packet Forwarding Using Efficient Multi-Dimensional Range Matching", by T. V. Lakshman et al., published 1998 by Bell Laboratories of Holmdel, N.J.

"Scalable Packet Classification", by Florin Baboescu et al., published 2005 by IEEE.

"Scalable and Parallel Aggregated Bit Vector Packet Classification using Prefix Computation Model", by Srinivasan T. et al., published 2006 by IEEE.

"Scalable Packet Classification using Bit Vector Aggregating and Folding", by Ji Li et al., published by MIT Laboratory for Computer Science of Cambridge, Mass.

The disclosure of the above articles is incorporated by reference herein in its entirety.

Figure 4:
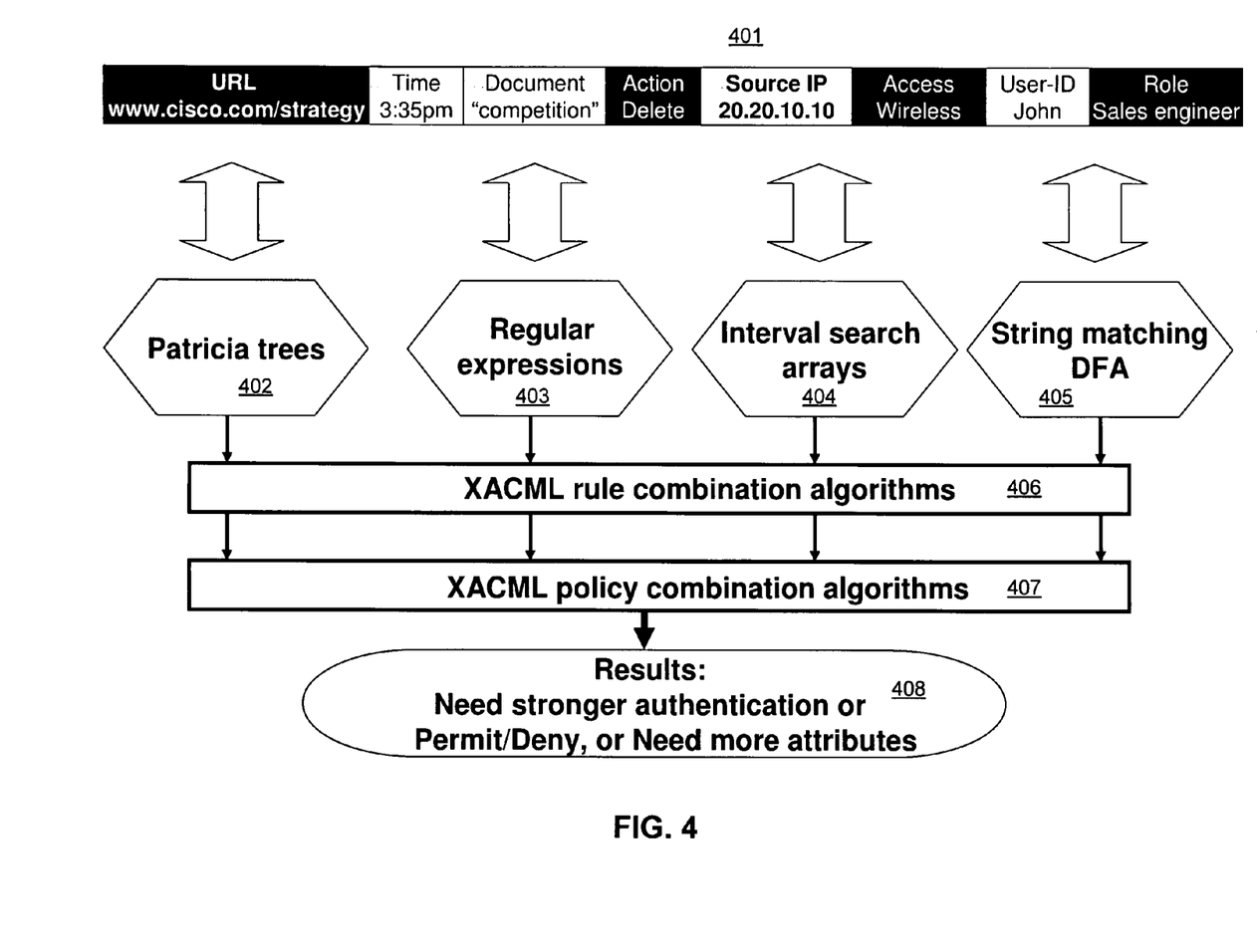
FIG. 4 is a block diagram illustrating an example of operations by a rule engine according to one embodiment of the invention.

FIG. 4 is a block diagram illustrating an example of operations by a rule engine according to one embodiment of the invention. Referring to FIG. 4, given multiple attributes 401

(e.g., URL, time, document, action, source IP address, access method, user ID, and role, etc.) associated with a request for accessing a resource, multiple individual searches 402-405 for all of the attributes are performed concurrently in the policy store using a variety of algorithms. Individual search results at the rule level 406 and policy level 407 are combined to generate a single final result 408 which is used to determine whether the request should be permitted or denied, etc.

Note that each of the processing logic 402-405 is configured to handle a specific type of search using a specific algorithm and a specific data structure. For example, a Patricia tree is a specialized set of data structure based on the trie that is used to store a set of strings. In contrast with a regular trie, the edges of a Patricia tree are labeled with sequences of characters, bit strings such as integers or IP addresses, or generally arbitrary sequences of objects in lexicographical order.

In computing, a regular expression (regex or regexp) provides a concise and flexible means for identifying strings of text of interest, such as particular characters, words, or patterns of characters. Regular expressions are written in a formal language that can be interpreted by a regular expression processor, a program that either serves as a parser generator or examines text and identifies parts that match the provided specification.

The Aho-Corasick algorithm is a string searching algorithm, which is kind of dictionary-matching algorithm that locates elements of a finite set of strings within an input text. It matches all patterns at once, such that the complexity of the algorithm is linear in the length of the patterns plus the length of the searched text plus the number of output matches. The algorithm constructs a trie with suffix tree-like set of links from each node representing a string (e.g. abc) to the node corresponding to the longest proper suffix (e.g. bc if it exists, else c if that exists, else the root). It also contains links from each node to the longest suffix node that corresponds to a dictionary entry; thus all of the matches may be enumerated by following the resulting linked list. It then uses the trie at runtime, moving along the input and keeping the longest match, using the suffix links to make sure that computation is linear. For every node that is in the dictionary and every link along the dictionary suffix linked list, an output is generated.

Figure 5:
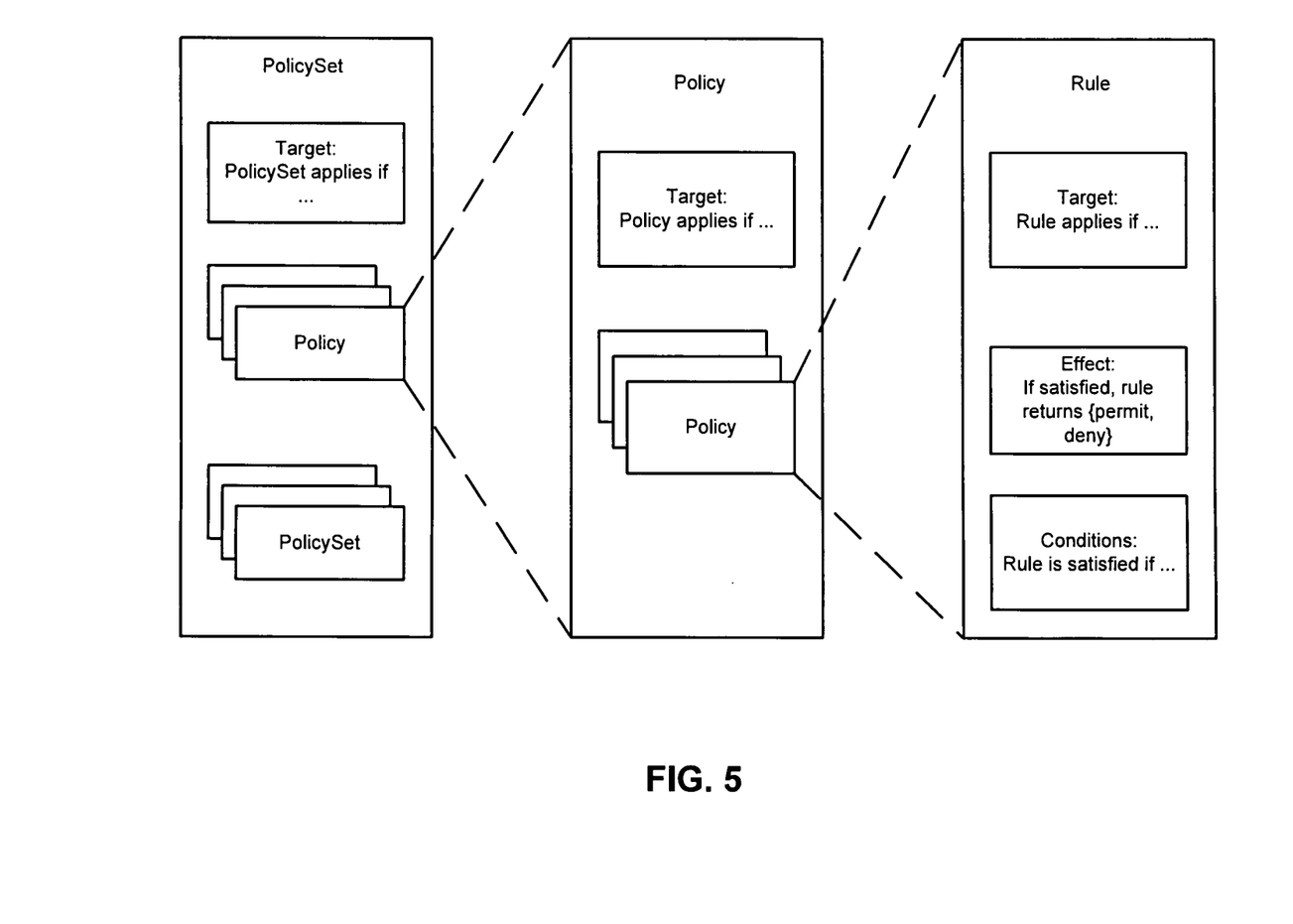
FIG. 5 is a block diagram illustrating an XACML based policy/rule architecture.

FIG. 5 is a block diagram illustrating an XACML based policy/rule architecture. Referring to FIG. 5, a policy is made up of rules. Policies can be grouped into one or more policy sets, which can also contain other policy sets, creating a hierarchy. Each policy and rule has a target. The target is a simple predicate that specifies which subjects, resources, actions, and environments the policy or rule applies to.

An XACML PDP starts evaluating a decision request with a top-level policy. It first evaluates that policy's target. If the target is "false" the policy is "Not Applicable", and no further evaluation is done of either that policy or of its descendants. If the target is "true", then the PDP evaluates the policies or rules at a next lower level, starting with their targets. Again, if a policy or rule's target is "false", then that particular policy or rule is not evaluated further.

At the bottom level, if the target of a rule is "true", then the rule's condition is evaluated. A condition is an arbitrary Boolean combination of predicates. XACML supplies a collection of functions, including arithmetic, to use in forming predicates. Each rule has an effect, which is either "permit" or "deny". If the condition is "true", then the rule's effect is returned. If the condition is "false", then "Not Applicable" is returned.

Each policy specifies a combining algorithm that specifies what to do with the results from the policies and rules it contains. One such algorithm is "deny overrides"; in this case, if any child policy or rule evaluates to "deny", then the policy evaluates to "deny". Another is "permit overrides"; in this case, if any child policy or rule evaluates to "permit", then the policy evaluates to "permit". Policies can have "obligations" associated with them. The combining algorithms also specify how to combine the "objections" from different policies.

Figure 6:
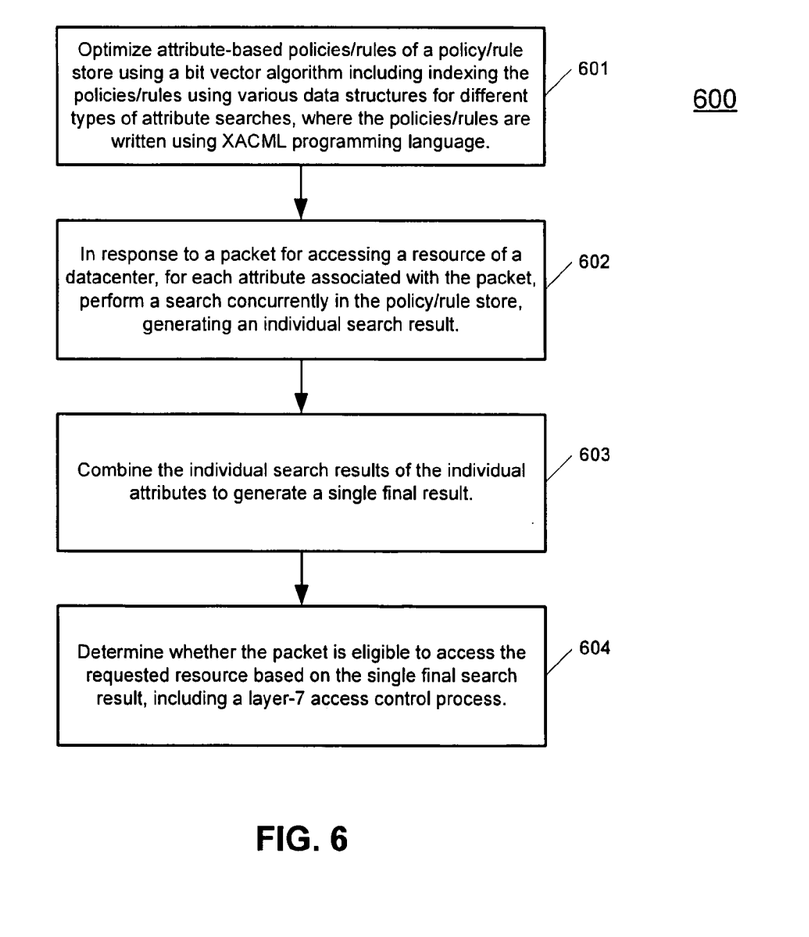
FIG. 6 is a flow diagram illustrating a process for evaluating XACML based policies in a highly parallel manner according to one embodiment.

FIG. 6 is a flow diagram illustrating a process for evaluating XACML based policies in a highly parallel manner according to one embodiment. Note that process 600 may be performed by processing logic which may include hardware, software, or a combination of both. For example, process 600 may be performed by system 300 of FIG. 3. Referring to FIG. 6, at block 601, attribute based policies and rules of a policy store are optimized using a bit vector algorithm, including indexing the policies and rules using a variety of data structures for different types of attribute searches. The policies and rules are written using XACML programming language, including user attributes and environment attributes. In response to a packet for accessing a resource of a datacenter, at block 602, for each attribute associated with the packet, a search is conducted concurrently in the policy store, generating an individual search result. At block 603, the individual search results are combined using a combining algorithm to generate a final result. At block 604, the final result is used to determine whether a client associated with the packet is eligible to access the requested resource, including a layer-7 access control process. Other operations may also be performed.

Thus, techniques for highly parallel evaluation of XACML policies have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   at an application service appliance device, receiving a request from a client device to access an application server;
   extracting from the request a plurality of attributes comprising a user attribute identifying a user of the client device and an environment attribute identifying an environment associated with the user;
   performing a plurality of individual searches concurrently, one for each of the attributes, in order to generate a plurality of individual search results, for one or more policies in a policy store to determine whether the policies, when compared to a corresponding one of the attributes, indicate that the client device is authorized to access the application server, wherein each of the policies is grouped into one or more policy sets and each policy has a plurality of child rules, and wherein a combining algorithm of each of the policies specifies that when one of the child rules produces an evaluation result, a corresponding policy also produces a same evaluation result without having to further evaluate the request;
   combining the plurality of individual search results associated with the attributes;
   generating a single final result from the combining;
   determining whether the client device is eligible to access the application server based on the single final result; and
   performing an open system interconnection (OSI) layer-7 access control process on packets of the request from the client device.

2. The method of claim 1, wherein performing the plurality of individual searches comprises performing the individual searches using a particular type of data structure designed for a type of content associated with respective individual searches.

3. The method of claim 2, wherein performing the plurality of individual searches comprises performing the individual searches using the data structure having an interval tree hierarchy based on one or more numeric operators.

4. The method of claim 3, wherein performing comprises performing the individual searches based on the numeric operators that comprise at least one of "<", "( )", "[ ]", ">", "<=", ">=", and "==".

5. The method of claim 2, wherein performing the plurality of individual searches comprises performing the individual searches using the data structure having an Aho-Corasick deterministic finite automation (DFA) hierarchy based on one or more substrings.

6. The method of claim 2, wherein performing the plurality of individual searches using the data structure comprises performing the individual searches using the data structure having a Patricia tree hierarchy based on one or more prefixes.

7. The method of claim 1, wherein combining the plurality of individual search results comprises combining the plurality of individual search results using a policy combination algorithm which includes one of a deny-override algorithm and a permit override algorithm.

8. The method of claim 1, wherein extracting comprises extracting the plurality of user attributes which comprise one of a uniform resource locator (URL), time, document, action, source internet protocol (IP) address, access method, user identifier and role attribute.

9. The method of claim 1, wherein performing the plurality of individual searches comprises performing the plurality of individual searches for one or more policies stored in the policy store using a bit vector algorithm and written in an extensible access control markup language (XACML).

10. A machine-readable storage device having instructions stored therein, which when executed by a processor, cause the processor to:
    extract from a request received from a client device to access an application server a plurality of attributes comprising a user attribute identifying a user of the client device and an environment attribute identifying an environment associated with the user;
    perform a plurality of individual searches concurrently, one for each of the attributes in order to generate a plurality of individual search results for one or more policies in a policy store to determine whether the policies, when compared to a corresponding one of the attributes, indicate that the client device is authorized to access the application server, wherein each of the policies is grouped into one or more policy sets and each policy has a plurality of child rules, and wherein a combining algorithm of each of the policies specifies that when one of the child rules produces an evaluation result, a corresponding policy also produces a same evaluations result without having to further evaluate the request;
    combine the plurality of individual search results associated with the attributes;
    generate a single final result from the combined individual search results;
    determine whether the client device is eligible to access the application server based on the single final result; and
    perform an open system interconnection (OSI) layer-7 access control process on packets of the request from the client device.

11. The machine-readable storage device of claim 10, wherein the instructions that cause the processor to perform the plurality of individual searches comprise instructions that cause the processor to perform the individual searches using a particular type of data structure designed for a type of content associated with respective individual searches.

12. The machine-readable storage device of claim 11, wherein the instructions that cause the processor to perform the plurality of individual searches comprise instructions that cause the processor to perform the individual searches using the data structure having an interval tree hierarchy based on one or more numeric operators.

13. The machine-readable storage device of claim 12, wherein the instructions that cause the processor to perform the plurality of individual searches comprise instructions that cause the processor to perform the individual searches based on the numeric operators that comprise at least one of "<", "( )", "[ ]", ">", "<=", ">=", and "==".

14. The machine-readable storage device of claim 11, wherein the instructions that cause the processor to perform the plurality of individual searches comprise instructions that cause the processor to perform the individual searches using the data structure having an Aho-Corasick deterministic finite automation (DFA) hierarchy based on one or more substrings.

15. The machine-readable storage device of claim 11, wherein the instructions that cause the processor to perform the plurality of individual searches comprise instructions that cause the processor to perform the individual searches using the data structure having a Patricia tree hierarchy based on one or more prefixes.

16. The machine-readable storage device of claim 10, wherein the instructions that cause the processor to combine the plurality of individual search results comprise instructions that cause the processor to combine the individual search results using a policy combination algorithm which includes one of a deny-override algorithm and a permit override algorithm.

17. An apparatus comprising:
a memory configured to store a policy store with a plurality of policies accessible by one or more processors;
a network service processor; and
an application service processor coupled to the network service processor and the policy store and configured to:
receive a request from a client device to access an application server;
extract from the request a plurality of attributes comprising a user attribute identifying a user of the client device and an environment attribute identifying an environment associated with the user;
perform a plurality of individual searches concurrently, one for each of the attributes, in order to generate a plurality of individual search results, for one or more policies in the policy store to determine whether the policies, when compared to a corresponding one of the attributes, indicate that the client device is authorized to access the application server, wherein each of the policies is grouped into one or more policy sets and each policy has a plurality of child rules, and wherein a combining algorithm of each of the policies specifies that when one of the child rules produces an evaluation result, a corresponding policy also produces a same evaluation result without having to further evaluate the request;
combine the plurality of individual search results associated with the attributes;
generate a single final result from the combined individual search results;
determine whether the client device is eligible to access the application server based on the single final result; and
perform an open system interconnection (OSI) layer-7 access control process on packets of the request from the client device.

18. The apparatus of claim 17, wherein the application service processor is further configured to perform the plurality of individual searches using the data structure designed for a type of content associated with respective individual searches.

19. The apparatus of claim 18, wherein the application service processor is further configured to perform the plurality of individual searches based on the data structure having an interval tree hierarchy based on one or more numeric operators, including at least one of "<", "( )", "[ ]", ">", "<=", ">=", and "==".

20. The apparatus of claim 18, wherein the application service processor is further configured to perform the plurality of individual searches using the data structure having an Aho-Corasick deterministic finite automation (DFA) hierarchy based on one or more substrings.

21. The apparatus of claim 18, wherein the application service processor is further configured to perform the plurality of individual searches using the data structure having a Patricia tree hierarchy based on one or more prefixes.

22. The apparatus of claim 17, wherein the application service processor is further configured to combine the plurality of individual search results using a policy combination algorithm which includes one of a deny-override algorithm and a permit override algorithm.

* * * * *